United States Patent [19]

Frey et al.

[11] 4,274,856

[45] Jun. 23, 1981

[54] METHOD FOR DEVELOPING A RELEASE SURFACE ON A GLASS MOLD

[75] Inventors: William I. Frey, Curtisville; William R. Beestrice, New Kensington, both of Pa.

[73] Assignee: PPG Industries, Inc., Pittsburgh, Pa.

[21] Appl. No.: 108,931

[22] Filed: Dec. 31, 1979

[51] Int. Cl.³ .......................................... C03B 23/023
[52] U.S. Cl. .......................................... 65/24; 65/27; 65/374 RM
[58] Field of Search ............... 65/28, 26, 374 RM, 27, 65/374 R; 252/12, 28; 264/39; 427/352

[56] References Cited

U.S. PATENT DOCUMENTS

| 3,808,077 | 4/1974 | Rieser et al. ...................... 156/99 X |
| 4,110,095 | 8/1978 | Stengle ................................. 65/26 |

*Primary Examiner*—Arthur D. Kellogg
*Attorney, Agent, or Firm*—Donna L. Seidel

[57] ABSTRACT

An improved release surface for a laminating mold is disclosed wherein a glass mold surface is treated with methylchlorosilane to provide a release surface which is then polished with a polar solvent such as alcohol to remove oily residue from the release surface of the mold so that the surface of the released article is free from haze.

6 Claims, No Drawings

METHOD FOR DEVELOPING A RELEASE SURFACE ON A GLASS MOLD

BACKGROUND OF THE INVENTION

The present invention relates generally to the art of release coatings on glass surfaces and more particularly to methylchlorosilane treated glass release surfaces.

Methylchlorosilanes and methylsilazanes are employed as hydrophobic, electrically insulating, permanent surface treatments on cellulosic or siliceous substrates. For example, such surface treatments are known to render glass container surfaces less readily wettable by organic contents.

In the art of laminating plastic to glass, U.S. Pat. No. 3,808,077 to Rieser et al discloses fabricating a glass and polyurethane bilayer windshield by assembling a preformed plastic sheet between a glass sheet and a mold surface with a suitable parting material such as polyvinyl fluoride, polyethylene glycol terephthalate and organopolysiloxanes.

SUMMARY OF THE INVENTION

The present invention involves the treatment of a glass mold with methylchlorosilane to provide a surface which releases plastic. Dimethyldichlorosilane is applied to the glass mold in the presence of water vapor which hydrolyzes the silane. The hydrolyzed silane can then react with the glass to form a release surface. However, the hydrolyzed silane can also react with other silane to form an oily deposit, presumably dimethylsiloxane polymer, on the release surface. This residue must be removed to prevent its transfer to the plastic surface which results in the formation of haze which is commercially unacceptable in a transparent article. According to the present invention, this deposit is best removed by washing with a polar solvent.

DESCRIPTION OF THE PREFERRED EMBODIMENT

A glass substrate is preferably used as a mold in the fabrication of a glass/plastic laminate because of its optically smooth surface and its similarity in physical properties, such as coefficient of thermal expansion, to the glass lamina. However, the glass mold, like the glass lamina, will adhere to the plastic unless an efficient release surface is developed. According to the present invention, a superior release surface is prepared by contacting the glass surface with dimethyldichlorosilane in the presence of water vapor to form a durable, efficient release surface on the glass, and then cleaning the release surface with a polar solvent to remove the residual hydrolysis products from the glass release surface to prevent transfer of the residue to the plastic surface during lamination resulting in a visible haze.

Glass molds large enough for use in fabricating windshields are treated with dimethyldichlorosilane in a 76"×30"×36" galvanized steel spray chamber equipped with a large double door for ease of handling the large substrates which are mounted on wooden racks. Although as many as twelve substrates may be treated simultaneously, it is recommended that about six should be treated for optimum uniformity and durability.

An opening is provided in the front of the chamber for the introduction of water vapor while an opening in the back is provided to exhaust vapors into a hood. Small openings are provided at the sides of the chamber for spraying the dimethyldichlorosilane into the chamber.

Glass substrates to be treated are cleaned and place on the wooden racks inside the spray chamber. A humid atmosphere is maintained therein, preferably at least about 55 percent relative humidity of water at ambient temperature. The silane is then sprayed into the closed chamber until a heavy aqueous-silane fog is formed. The glass substrates are maintained in the aqueous-silane fog for several minutes, and then the chamber is exhausted into the hood for at least about 10 minutes. The silane treated glass substrates must be removed with caution, as the release surfaces are extremely slippery.

The excess silane material on the release surface must be removed before the glass substrate can be used. While a high temperature cure is not required to produce a good release surface, it is preferred in order to facilitate removal of the excess silane. A 15 minute cure at about 300° F. (149° C.) is sufficient, but an hour cure at about 400° F. (204° C.) is preferred.

The removal of excess silane material from the release surface is accomplished according to the present invention by washing with a polar solvent. Hand buffing with cloth or paper towels is sufficient, although repeated washings may be necessary to remove all of the residue. It is very important to remove all traces of the residue, since any residue on the release surface will transfer to a plastic surface contacted thereby resulting in a haze which is commercially unacceptable in a transparent article.

The polar solvents preferred according to the present invention are lower alcohols and alcohol/water mixtures. A particularly preferred cleaning solvent is a 50/50 by volume mixture of isopropanol and water. Another particularly preferred solvent is denatured alcohol. A very effective cleaning procedure involves a first wash with anhydrous denatured alcohol and a second with aqueous isopropanol.

The present invention will be further understood from descriptions of specific examples which follow.

EXAMPLE I

Clean glass substrates 12 inches (30.5 centimeters) square are mounted on a wooden rack and placed in a chamber at ambient temperature with sufficient water to provide about 55 percent relative humidity. Dimethyldichlorosilane is sprayed into the chamber and a heavy aqueous-silane fog is formed. After a few minutes, the fog is exhausted from the chamber and the glass substrates are removed with caution since the surfaces are covered with an oily residue which is extremely slippery. This residue is removed by hand buffing with cloth or paper towels using an equal volume solution of isopropanol and demineralized water. Although repeated washings are necessary to remove the residue, the result is a highly polished surface which readily releases a plastic surface without transfer of residue which would otherwise detract from the optical quality of the released article.

EXAMPLE II

Glass substrates are treated as in Example I except that the washing is done with denatured alcohol. Equally effective release surfaces are obtained.

EXAMPLE III

Glass substrates are treated as in the previous examples except that the initial washing is done with anhydrous denatured alcohol comprising 95 percent ethanol and 5 percent methanol. A light film remains after the initial washing which is readily removed with an equal volume solution of isopropanol and water. Equally effective release surfaces are obtained with less total cleaning effort than is required in the previous examples.

These examples are offered to illustrate the present invention, the scope of which is defined by the following claims.

We claim:

1. A method for producing a non-transferring release surface on a glass substrate comprising the steps of:
   a. treating a glass substrate with a combination of methylchlorosilane and water vapor for a sufficient time to form a film on the glass surface, wherein said film comprises an oily residue; and
   b. cleaning the treated surface with a polar solvent to remove said residue.

2. The method according to claim 1, wherein the solvent comprises a lower alcohol.

3. The method according to claim 2, wherein the alcohol is selected from the group consisting of methanol, ethanol and propanol.

4. The method according to claim 3, wherein the alcohol is isopropanol and the solvent further comprises water.

5. The method according to claim 3, wherein the alcohol is denatured ethanol.

6. In a method for treating a glass surface with a combination of dimethyldichlorosilane and water vapor to produce a release surface wherein an oily residue is formed on the release surface, the improvement which comprises removing the residue from the release surface with a polar solvent which comprises a lower alcohol selected from the group consisting of methanol, ethanol and isopropanol.

* * * * *